United States Patent [19]

Matthews et al.

[11] 4,211,305

[45] Jul. 8, 1980

[54] SOUND ABSORBING DEVICE

[76] Inventors: Carl Matthews, 102 Gloucester Rd.; Elizabeth de Recourt Martyn, 37, Stanhope Gardens, both of, London, England

[21] Appl. No.: 959,365

[22] Filed: Nov. 9, 1978

Related U.S. Application Data

[63] Continuation-in-part of Ser. No. 763,547, Jan. 28, 1977, abandoned, which is a continuation-in-part of Ser. No. 888,873, Mar. 22, 1978, abandoned.

[51] Int. Cl.² ............................................. F01N 1/24
[52] U.S. Cl. ........................... 181/248; 181/252; 181/258; 181/296
[58] Field of Search ............... 181/222, 224, 247, 252, 181/256–258, 227, 284, 286, 290, 294, 296, 198, 175, 288; 138/40, DIG. 2

[56] References Cited

U.S. PATENT DOCUMENTS

| 2,001,970 | 5/1935 | Mazer | 181/288 |
| 2,073,951 | 3/1937 | Servais | 181/252 |
| 3,954,031 | 5/1976 | Tull et al. | 181/198 |

FOREIGN PATENT DOCUMENTS

| 504653 | 12/1954 | Italy | 181/252 |
| 563110 | 7/1944 | United Kingdom | 181/252 |

*Primary Examiner*—L. T. Hix
*Attorney, Agent, or Firm*—Cushman, Darby & Cushman

[57] ABSTRACT

Acoustic energy is absorbed from a moving fluid by passing the fluid, which is typically a gas, over a surface covered with a multiplicity of fibers or filaments, each filament having one end attached directly or indirectly to the surface and its other end free and extending into the fluid stream. Automobile or marine mufflers or silencers effective in reducing or eliminating objectionable noise, but with only nominal back pressure, are disclosed.

16 Claims, 14 Drawing Figures

SOUND ABSORBING DEVICE

CROSS-REFERENCE TO RELATED APPLICATION

This application is a continuation-in-part of our application Ser. No. 763,547 filed Jan. 28, 1977, now abandoned, which in turn is a continuation-in-part of our application Ser. No. 888,873 filed Mar. 22, 1978 now abandoned.

SUMMARY OF THE INVENTION

The present invention relates to the selective absorption of acoustic energy from kinetic energy under conditions of relative motion between a surface and a fluid.

More particularly the invention provides means for absorbing acoustic energy from a fluid stream, such as a gas, which is a device including a surface past which surface the fluid stream can flow, preferably with minimal or no loss of kinetic energy due to surface resistance. The surface is provided with a plurality of fibers or filaments of a relatively small diameter, each having one of its ends operatively attached, either directly or indirectly, to the surface and its other end extending freely into the fluid stream.

The present invention, in its method aspect, provides for a method of absorbing acoustic energy from a moving fluid stream, usually a gas, by passing the fluid stream over and in contact with at least one surface carrying a multiplicity of fibers or filaments of a relatively small diameter, as described above. The moving fluid stream impinges upon the free ends of the fibers or filaments and the fibers absorb acoustic energy. The method of the present invention also includes passing a moving fluid stream over and in contact with a plurality of surface layers and carrying fibers or filaments, each layer being bonded or mechanically attached to the other.

The invention is particularly useful, for example, in providing an exhaust system or portion of the exhaust system of any desired shape of configuration for an internal combustion engine such as a motor vehicle, marine craft or aircraft, and specifically as a replacement for a conventional automotive muffler.

The present invention also includes the use of a surface having a plurality of fibers or filaments, as described above, as a portion of an air conditioning/heating duct which may be oval, square, circular or of any desired cross-sectional shape. The air passing through such a duct is able to flow with only minimal loss of kinetic energy due to surface resistance, while at the same time the flexing fibers or filaments serve to silence or muffle the airflow.

The device of the present invention may also be useful as an integument applied to the external or internal face of a solid in order to absorb acoustic radiation from the solid.

According to one feature of the present invention the fibers are preferably flexible, their free ends usually extending parallel to and trailing in the fluid with respect to the direction of fluid or surface movement.

The fibers may be inorganic, metal-organic or any suitable material provided that the fibers possess physical and chemical properties appropriate for their integrity and survival for an acceptable period of use in the environment in which they are placed. Thus, for example, for endurance in an engine exhaust system of a marine craft where the exhaust gas is cooled, such as by water injection, the fibers may be of organic origin. By contrast, in the dry and uncooled conditions of the engine exhaust of an automobile, aircraft or the like, the fibers should preferably be of an inorganic material having a refractoriness and insolubility which are appropriate, and in this case could be of siliceous ceramic, carbon or similar material. Conversely they may be metallic, or a mixture of any one or more of the above. Selection of an appropriate fiber may be determined through preliminary experimentation by one skilled in the art. It is preferred that the average diameter of the fibers or filaments employed will be in the range of about 1 to about 50 microns in size.

The configuration of the fibers may be such that they are sufficiently close together so that their free ends define a substantially regular geometrical surface beyond which there is no obstruction, or relatively little obstruction, to the passage of the fluid. Furthermore, since this surface is flexible and of low reflectivity, the acoustic energy present in the fluid is readily transmitted through it and absorbed by the mass of fibers between it and the outer casing. The fibers at least initially extend normal to the surface to which their fixed ends are attached, although over a period of use may become bent or curved in the direction of the fluid flow.

DETAILED DESCRIPTION OF THE DRAWINGS

Figure 1:
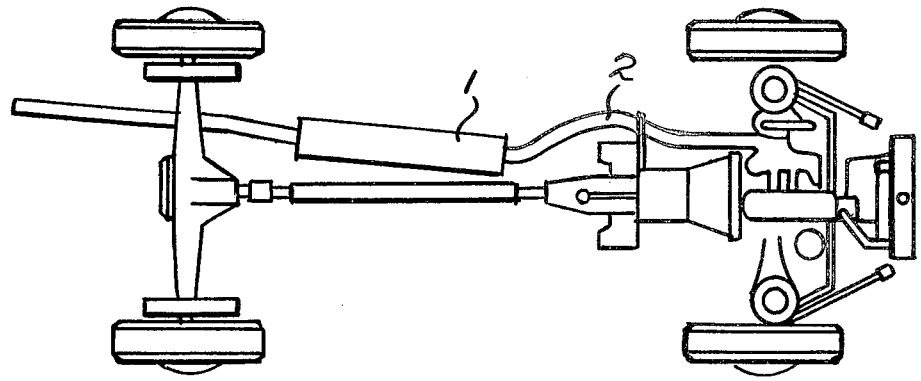
FIG. 1 is top view partial representation of an automobile showing a suggested positioning of the muffler of the present invention.

FIG. 1 depicts an automobile showing the layout of a typical muffler system. The fur invested pipe or muffler 1, which is shown in more detail in the following figures, may be situated anywhere along the exhaust line 2. The muffler may, if necessary, comprise more than one invested section or the entire exhust pipe may be invested. Although this figure shows muffler 1 as being of greater external diameter than exhaust pipe 2, the extension of this enlargement has been (for purposes of illustration) magnified. It is important that the internal space in muffler 1 should not be less than the average diameter of the exhaust line 2. In this way no constriction is built into the exhaust line and no additional back pressure is created.

Figure 2:
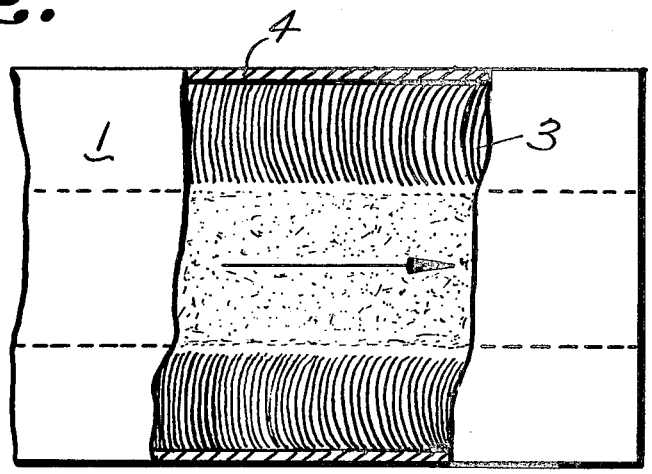
FIGS. 2-7 are partially broken-away cross-sectional views of various embodiments of mufflers as illustrative of the present invention.

FIG. 2 is a partially broken-away cross-sectional view of muffler 1 in which the fur investment 3 is bonded directly to the wall of the muffler 4. The fiber may be bonded chemically to the wall or form an intricate part of the muffler wall 4, in which case the bonding is mechanical. Accordingly, the fur may comprise the glass backing into which the fiber is woven and at the same time form that part of the silencer pipe which is invested.

Figure 3:
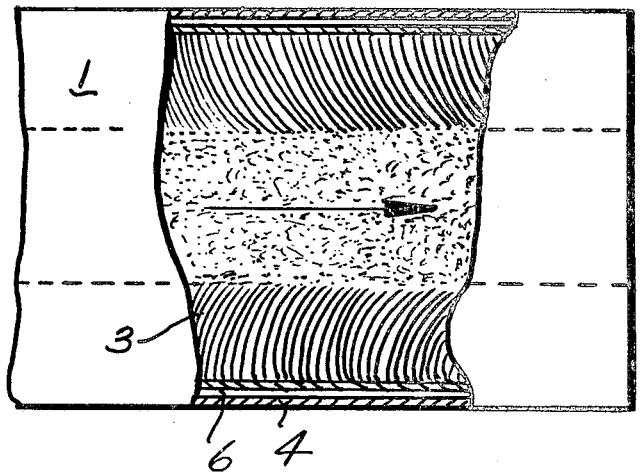

FIG. 3 is similar to FIG. 2 except that the fur investment 3 is not an integral part of the side wall 4 but is bonded to a separate backing 6. Various backing materials and the like are explained in detail below.

Figure 4:
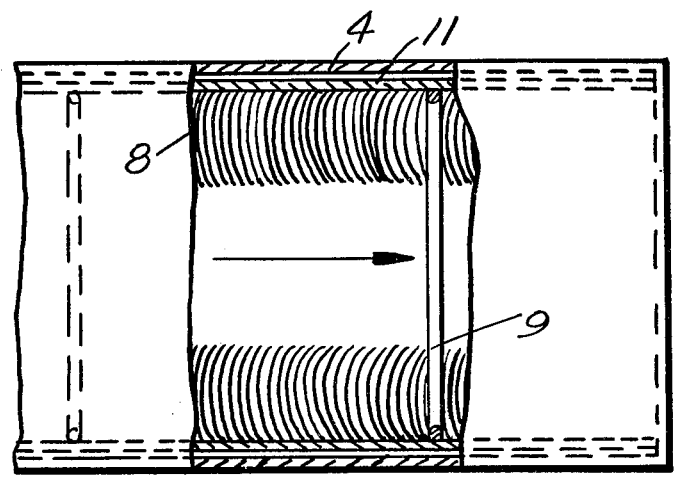
Figure 5:
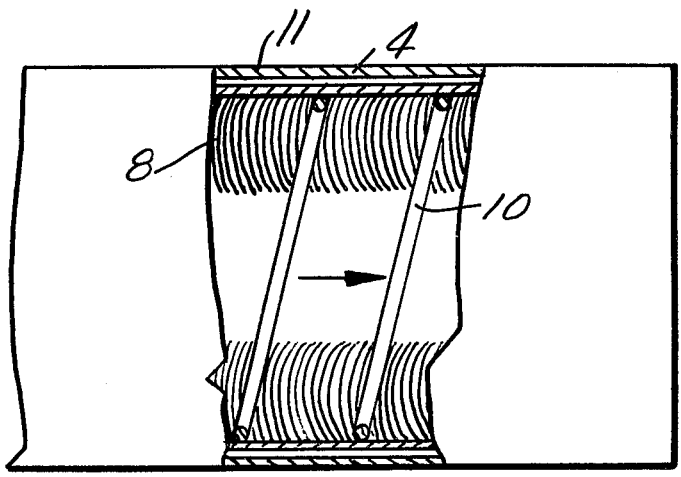

FIGS. 4 and 5 depict arrangements whereby a sleeve or sock of woven material 8 is physically retained in the exhaust system. FIG. 4 is an illustration where the sleeve of material is held in place by individual circular or semi-circular spring rings 9 and FIG. 5 illustrates the use of a continuous spiral coil spring 10. In both cases the fabric base 11 is situated between the retaining device 9 or 10 and the wall of the exhaust system 4 is retained in place by the outward flexion of the ring against the exhaust wall.

Figure 6:
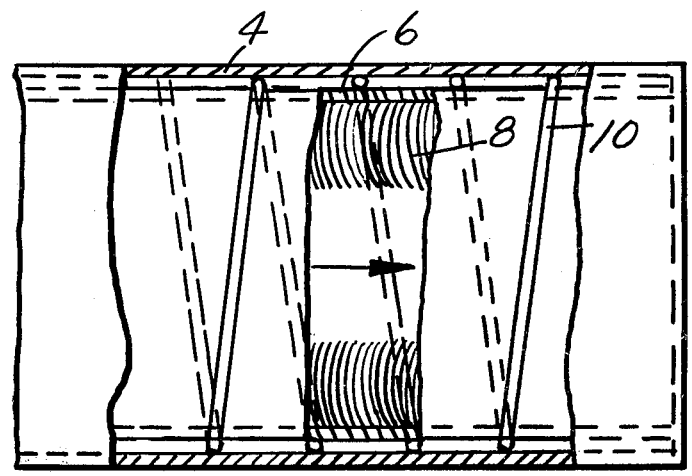

FIG. 6 depicts a preferred manner of retaining the sleeve of woven material 8 in the exhaust system. As illustrated, the continuous spiral coil spring 10 is positioned between the fabric base 6 and the muffler wall 4, the spring being bonded, such as sewn or threaded, into the fabric base.

Figure 7:
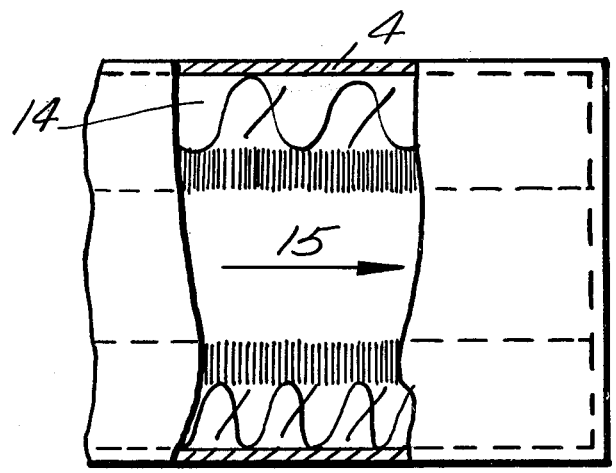

FIG. 7 is an illustration of the present invention wherein the investment comprises randomly orientated fibers 14 in which a proportion of the fibers are at right angles to and project into the gas stream 15. The randomly oriented fibers 14 may be bonded directly to the muffler wall 4, or if the fibers 14 are sufficiently thick they may not require physical or chemical bonding since the fibers 14 may be regarded as the backing material, and if invested into the exhaust system under pressure, will remain there of their own accord.

Figure 8:
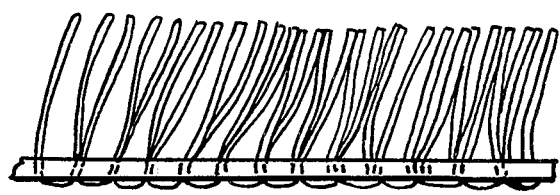
FIGS. 8 and 9 are detailed cross-sectional views of investments according to Examples 1 and 3, respectively.

FIG. 8 is another embodiment of the present invention in which the fibers are sliver knitted into a pile-like configuration in which the free ends extend into the passing gas stream.

Figure 9:
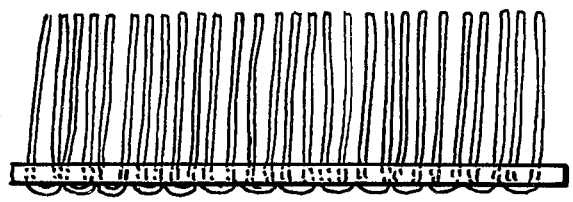

FIG. 9 is yet another embodiment of the present invention in which the fibers are tufted into a carpet backing, the upwardly projecting pile loops conveniently being slit open providing the required fiber ends.

Figure 10:
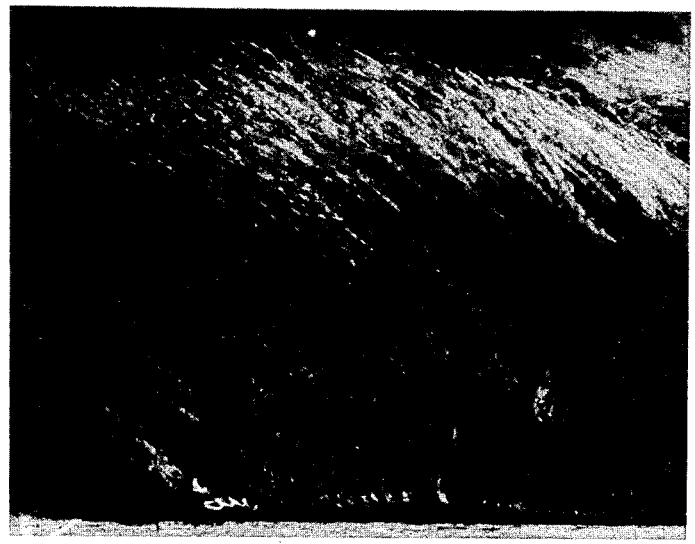
Figure 11:
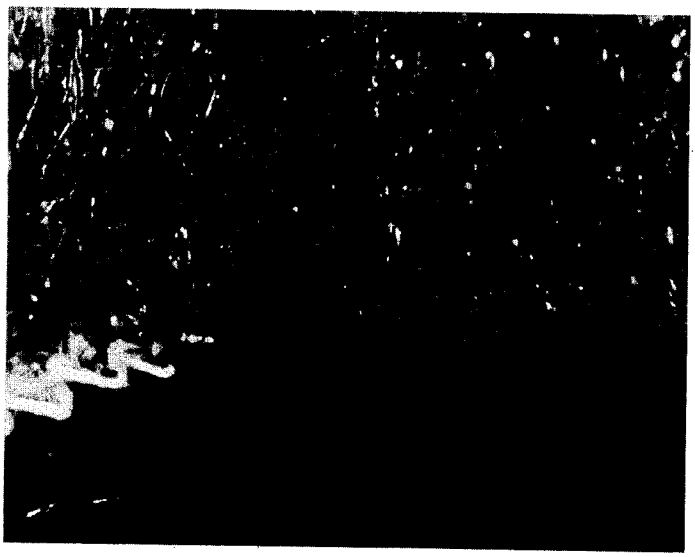
Figure 12:
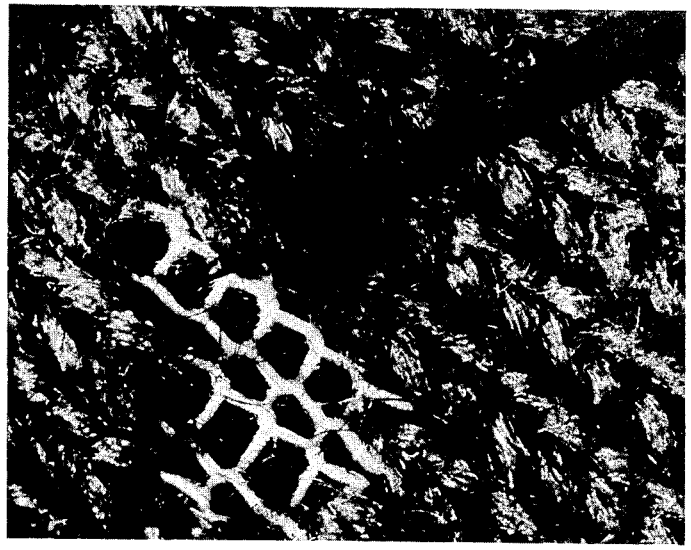
Figure 13:

FIG. 10 is a photograph of the cross-section of the acrylic fur used in Example 1;

FIG. 11 is a cross-sectional photographic view of a glass fiber fur as illustrated in FIG. 8;

FIG. 12 is a plane photographic view of a sliver knit glass fiber fabric base;

FIG. 13 is a plane photographic view of a woven glass fiber fabric base; and

Figure 14:

FIG. 14 is an end photographic view of an individual glass fiber bunch of fur pile of FIG. 13.

DETAILED DESCRIPTION OF THE INVENTION

For purposes of the present discussion reference is made to FIG. 2 as being illustrative. In this Figure the interior wall of conduit 4, shown in an axial cross-section, is provided with an investment of flexible, unidirectional, closely spaced fibers 3 which have a general appearance of animate fur. The free ends of the majority of the fibers, after rising from the internal wall 4 to which they are operatively attached, at least initially assume positions substantially parallel to the direction of fluid flow.

When the construction of the present invention is used in an automobile engine exhaust system, it has been found that the acoustic energy present in the gas can be absorbed to a very high degree without incurring any substantial decrease in the kinetic energy of the gas.

This device then provides an exhaust which can be totally silent with minimal back pressure, or, at high velocities of flow, pressure of such low value that the engine maintains higher efficiency than is normally the case. This is an important feature of the present invention. A conventional automobile muffler reduces the noise made by the auto engine using a series of baffle plates, packings and walls inside of the muffler. In reducing noise a substantial amount of back pressure is created which decreases the efficiency of the engine. By reducing back pressure, the overall operating efficiency and economy of the engine are improved.

While we have not fully elaborated the theory of operation of our invention, a reasonable explanation appears to be that alternating compression/depression waves of acoustic energy of both longitudinal and transverse propagation are absorbed by reason of the multiplicity of phase changes and this energy is transformed into heat. Also a high viscosity is provided in the closely spaced fibers by the very great number of air columns of minute diameters which interspace the filaments, such columns being a factor in the acoustic energy absorption.

Taking an automobile exhaust system as an example, it is preferred that the free ends of the fibers define an opening of about the same cross-sectional area as that of the bore of an incoming exhaust line. To allow the exhaust gases to flow without resistance the minimum cross-sectional area normally required is maintained as an empty space in the fiber field, and the annular space between the empty space and the roots at or near the outer casing is occupied by the fibers, as described.

The fibers may be mechanically or adhesively attached to the conduit interior surface at their roots, or they may be secured to a backing layer and the backing layer fixed to the internal wall of the conduit. The backing layer may take the form of an open mesh into which the fibers are tufted, as in a cut loop pile carpet, or the fibers integrally a part of the backing itself, such as a sliver knit. When so attached an adhesive will be selected to be compatible with the fibers and capable of maintaining its integrity during conditions of operation. Depending on their composition they may, for example, be desposited electrochemically, cataphoretically, or by precipitation directly on the conduit surface or on a support which is attached to the conduit surface. They may be supported, or additionally supported, at intervals by a solid keeper which exerts a retaining pressure on the investment from the fluid face, such retainer having a small cross-sectional dimension. An example of this is an arrangement of small diameter rods or a spiral of rod or wire so introduced that the rod or wire becomes substantially buried in the investment, or it may be attached to the investment backing by sewing, stapling or other means as illustrated in FIGS. 4–6.

The keeper may even be, for example, a gauze or mesh having a very high percentage of open area. Clearly, the greater the total area of such solid and rigid keeper material which is not well buried into the investment, the less the acoustic absorbent efficiency of the investment will be.

In the event the keeper or retainer is inadvertently exposed to the sound waves present in the fluid, it is possible to arrange, in the case of the spiral rod for example, that the pitch or wave length is an aliquant of the total length of uninterrupted pipe section. An aliquot part could conceivably give rise to harmonics of certain frequencies. The leading edge of the investment may be protected from attack by the fluid or gas by insert of a short collett, usually of metal, having one end swaged.

According to the various embodiments of the devices of our invention the fibers may extend perpendicularly from the internal wall of the conduit and remain so over the whole or their length. With this arrangement, in use, the fluid flow may cause the fibers to bend over at some distance from their roots. So as to provide the optimum or most economical use of materials, a ratio will be established involving several factors, such as the amount of incident energy and the statistical data relating to the fibers, population per unit area, density or specific gravity, Young's modulus, diameter, and length—particularly that part of the fiber investment which is parallel to the direction of fluid flow—the effective thickness or depth from the roots when in use, evironment humidity, and the length of axial path invested with the fibers.

Since one of our principles is to provide a gas passage which has a relatively smooth and flexible face having low acoustic reflectivity but high transmission, we have, according to another aspect of our invention, found that the acoustic energy present in a flowing gaseous stream can be absorbed effectively without incurring any substantial decrease in the kinetic energy of the gas by providing an investment to the interior wall of a muffler or exhaust system silencer casing which comprises a sound absorbing material of a mass of fibers, either oriented or randomly oriented as in the case of a felt. The fibers which extend to the surface, being flexible, are readily bent over by the gas stream to become trailing, as previously described. They may also be brushed or carded or blown before being installed. This embodiment of the invention is illustrated in FIG. 7.

In yet another embodiment of our invention the investment may be composed of randomly oriented fibers in the form of a felt. The felt is obtained by conventional techniques such as needling the fiber mass leaving a multiplicity of fibrous projections on the surface. The fibers may be of inorganic, metal organic or organic material, but should have physical and chemical properties appropriate for their survival for a useful period in their environment. The fibrous mat investment must be constructed in order that the component fibers exposed to the gas face are maintained in position by their mechanical strength and this is an example of many of the filaments being indirectly fixed to the support. Thus for use in the exhaust silencer or muffler of an internal combustion engine, the investment should have a refractoriness appropriate to these conditions. The material employed may be siliceous or metallic and a preferred material is glass fiber capable of withstanding temperatures up to at least 550° C., which temperature is typical for the exhaust system of an automobile.

FIG. 8 illustrates another embodiment of our invention which in certain apparatus is well suited. As shown the fibers are exposed to the gas stream and extend perpendicularly from the surface, the fibers being sliver knitted to form an upstanding knit pile with their free ends extending freely into the gas stream. An alternative arrangement, shown in FIG. 9, employed a tufted carpet backing with the upstanding fibers tufted in it. There are various ways of exposing the free fibers to the gas stream, for instance with a loop pile cutting or slitting the loops open to expose the free ends.

The investment may be retained in position in the outer casing of the silencer by its own construction as an essentially rigid tubular member and is optionally provided with a backing layer for securing the fiber mat to the internal wall of the muffler casing. The investment may be supported by a spiral coil or wire or a rigid openwork material such as a wire mesh or gauze as illustrated in FIG. 6.

Our invention is further described and illustrated by the following examples of the use of various embodiments. In the testing reported relative aspects of approximate noise levels, temperatures and back pressures were measured on a comparative basis. Two types of embodiments of the invention were tested, one in a wet (marine) environment and the other in a dry environment.

FIGS. 10-14 are close-up photographs of various views illustrating the investment materials that may be used according to the present invention. In these photographs, particularly FIGS. 10, 11 and 14 both ends of the fur investment are free for extending into the gas stream. FIGS. 12 and 13 show the glass fiber backing on the underside of the investment material, the loop effect being demonstrated by the needle shown in each photograph. FIG. 14 is an end view of one bunch of glass fiber fur pile, portions of the backing on either side being removed. In the completed structure both tufts are upright, touch each other and are swept in the same direction by the passing gases.

EXAMPLE 1

An engine of 1100 cc displacement was randomly selected for convenience as one commonly used for road vehicles and also for small marine craft. A common practice in marine engineering is to cool the exhaust gas, as by water injection, and then discharge the cooled gas from the craft through an essentially unsilenced pipe or conduit. This is in contrast to an automobile exhaust system in which a muffler, silencer or the like is employed.

The dry gas temperature of the above engine emerging from the manifold was in the range of 500°-720° C., according to the gas velocity. Water was injected into the engine exhaust gas system at a rate of 2-2.5 gallons/minute or 9-11 liters of water/minute. A few inches downstream from the water injection point, the station being as usual conveniently close to the engine, the temperature of the engine exhaust gas mixed with water had dropped to 40-60° C.

This lower temperature level is well within the temperature tolerance of many organic filaments. In these tests an 80% chlorofibrous material, having a monofilament diameter in the region of 8 microns, derived from polyvinylchloride, mixed with an acrylonitrile was used for the exhaust pipe investment. The overall appearance was similar to the investment described in relation to FIG. 2 and a detailed cross-sectional view is shown in FIG. 9. The investment was a typical artificial fur and had a polyester backing with a polyacrylate resinous reinforcement, for all of which insolubility in boiling sea water is claimed by the makers (Borg Textiles Limited), and was secured to the internal part of the exhaust conduit.

For the water cooled run, the invested pipe was 11 ft. or 330 cm long, and the filaments had a dormant depth of ¾ inch or 20 mm.

The performance of the invested exhaust was compared with that of a normal water injected commercial system of equal bore, but having, as is also common, one silencer of the reaction type in the line. This routine system is also a standard installation in naval craft.

Before running the invested example precautions were taken, after injection, to separate out the water again so that the gas, having been cooled, was now dry or at least relatively dry. It was observed that the drier the filaments of the investment, the higher the acoustic absorption. There are many convenient methods of effecting separation of the injected water from the cooled exhaust gases, of which one or a combination thereof may be employed. Examples include the centrifugal effect of a pipe bend, making use of the traditional riser on board the craft, a short section containing transverse angled louvers, or if considerable length is available, separation by gravity into a collector trough or pipe.

During each test, the engine was run at engine speeds of 2300, 3500 and 5500 rpm. The length of the exhaust pipe was 120 inches measured from the engine manifold. The traditional (unmodified) system produced noise levels rising to about 65 dBA and back pressures of 3, 10 and 18 inches of water (75, 250 and 460 mm). With further engine acceleration in excess of 5500 rpm back pressure level rose steeply to 30 inches of water (760 mm).

The invested plain pipe of the present invention with no muffler was then compared. At 5500 rpm and above the effluent was silent and later the pipe had to be shortened to 9 ft. (270 cm) before exhaust became audible. At the quoted rpm periods the back pressure figures were 0 inches, 0.5-1 inch and 2 inches (0, 12, 25 and 50 mm), respectively.

Zero readings reflected the small inertia of the manometer and the above figures are corrected readings, meaning that the back pressure introduced by the bent downtake pipe arrangement of the manifold, which was a common factor throughout all observations was deducted. The results are reported in the following table.

TABLE I

| ENGINE SPEED IN RPM | BACK PRESSURE* (COMPARATIVE) | BACK PRESSURE ACCORDING TO INVENTION |
|---|---|---|
| 2,300 | 3 | 0 |
| 3,500 | 10 | 0.5-1 |
| 5,500 | 18 | 2 |
| in excess of 5,500 | 30 | — |
| noise level (max.) | 65 dBA | just audible |

*measured as inches of water in a manometer

From the above Table it will be apparent that in general terms the invested exhaust system of the present invention produced about ⅕th of the back pressure of the standard marine exhaust system. The higher the velocity, the larger the difference in comparative back pressure of the standard exhaust system and that according to the present invention.

In this example we were able to make use of an organic monofilament material owing to the reduced operational temperatures achieved by the use of water injection into the gas stream. This demonstrates that the physical and chemical composition of sound absorbent material are selected to be compatible with the environment in which it is used.

EXAMPLE 2

Dry tests were then done first for comparison with an engine fitted with a standard exhaust pipe with muffler made and sold by the engine maker of that engine.

Pollution by the noise of motor vehicles is clearly greatest in towns, cities and populated, developed areas, thus we therefore concentrated on noise level and pressure readings between engine idling and 50 mph, the tachometric speeds being 1000 rpm and 2,500 rpm. The conventional system had immediately, after the downtake pipe from the engine, a muffler of typical reaction design, and 4 feet of straight run of the pipe which was 1.25 inches in diameter, climbed over the back axle. A 2-inch diameter pipe invested with a glass fur, pile length ⅜ inch ran straight from the inlet station to the beginning of the bend in place of the conventional silencer. The following comparisons were recorded:

TABLE II

| | CONVENTIONAL SYSTEM | | INVESTED SYSTEM | |
|---|---|---|---|---|
| Engine Speed (RPM) | Back Pressure (Ins. Water) | Noise Level (dBA) | Back Pressure (Ins- Water) | Noise Level (dBA) |
| 1000 | 1 | 58 | 0.2 | 49 |
| 1500 | 2.25 | 61 | 0.5 | 56 |
| 2000 | 3.25 | 65 | 2 | 57 |
| 2500 | 5 | 72 | 3.5 | 61 |
| 3000 | 6.5 | 72 | 5 | 65 |

These readings show that at urban speeds the exhaust noise was reduced to about ⅛ and 1/12th while at the same time the back pressure dropped to about 1/5th and ⅔, respectively, with consequent fuel savings.

EXAMPLE 3

Example 2 was repeated using as an investment a glass fur material made by cutting the loops of a looped carpet material of which the pile and the backing was made from E-glass. There were approximately twice as many filaments in the fur as that used in Example 2. The average pile length was ½ inch and this was used as the investment of a 2¼ inch diameter pipe of the same length as used in Example 2.

The back pressure in inches of water at 2000 rpm was 0.75 inch, at 2500 rpm 1.25 inches and in the range 3500–4000 rpm 2.25 inches. The noise level was reduced by 3–5 dBA compared with those recorded in Example 2 at each of the three engine speeds.

A diagrammatic view of the investment is shown in FIG. 8.

We have also found that a gas may be released silently yet at high velocity from the end of a conduit such as a compressed air line. For related physical reasons, organ piping is eliminated without reduction of rheological efficiency.

Our invention is not to be considered limited in any way to the silencing of an internal combustion engine as there are diverse areas in which the principles set forth above also apply. Other areas in acoustics where our technique may be applied are those where high noise level impulse waves are produced; the absorbent effect of the investment considerably chops down the initial oscilloscope deflection.

Throughout the above discussion, illustrations, and examples, the unidirection of the fibers and filaments, or at least a majority of them, and consequently minimal reduction in kinetic energy, has been the theme. Paradoxically, the reverse may apply in certain cases. An example of this is that in some marine engine exhausts it is not only preferable, but vitally important to prevent any sea water returning under the force of a heavy wave back up to the engine. Clearly, the investment devices and procedures of our invention produce a resistance to such return flow.

It will be appreciated that various changes and modifications of the above-described invention can be made, and, to the extent that such variations incorporate the spirit of this invention, they are included within the scope of the appended claims.

We claim:

1. A device for absorbing acoustic energy from a moving fluid stream, said device comprising:
   a conduit having an interior surface, and
   a plurality of flexible, unidirectional closely spaced fibers operatively attached at one end thereof to said conduit interior surface, the free ends of said fibers extending generally inwardly from said conduit interior and into the moving fluid stream, said free ends extending generally parallel to and in the direction of fluid flow in said conduit so that the moving fluid stream impinges upon said free ends of said flexible fibers and that the free ends of said fibers define a generally regular geometrical surface providing an unobstructed fluid flow passage.

2. A device as claimed in claim 1 wherein said fibers have an average diameter of 1 to 50 microns.

3. A device as claimed in claim 1 wherein said conduit has a circular cross-section, and wherein said geometrical surface is circular in cross-section and generally concentric with said conduit.

4. A device as claimed in claim 1 wherein said fibers comprise a fiber mat having a multiplicity of unidirectional fiberous projections on the surface thereof.

5. A device as claimed in claims 1, 2, 3 or 4 further comprising means for retaining said plurality of fibers in place in operative attachment to said conduit interior surface, said means comprising a spiral coil of wire.

6. A device as claimed in claim 1 further including means for retaining said plurality of fibers in place in operative attachment to said conduit interior surface, said means comprising a wire mesh.

7. An exhaust system for an internal combustion engine comprising:
   an exhaust pipe;
   means operatively attached to said exhaust pipe for effectively absorbing the acoustic energy of fluid flowing through said exhaust pipe while allowing passage of the fluid therethrough such that only negligible back pressure is created,
   said means comprising a conduit disposed in line with said exhaust pipe, having an interior surface with a plurality of flexible, unidirectional, closely spaced fibers operatively attached at one end thereof to said conduit surface and having the free ends of said fibers extending generally inwardly into said conduit and into the moving fluid stream, said free ends extending generally parallel to and in the direction of fluid flow in said conduit so that the moving fluid stream impinges upon said free ends of said flexible fibers and that the free ends of said fibers define an unobstructed fluid flow passage of generally the same cross-sectional area as the cross-sectional area of said exhaust pipe.

8. The exhaust system as claimed in claim 7 wherein said internal combustion engine is a motor vehicle internal combustion engine.

9. A device for absorbing acoustic energy from a moving fluid stream, said device comprising:
   a conduit having an interior surface,
   means for absorbing acoustic energy from fluid flowing through said conduit without providing substantial surface resistance to the fluid flow, said means comprising a plurality of flexible unidirectional fibers, each fiber having a fixed end thereof operatively attached to at least a portion of said conduit interior surface, and having a free end thereof extending inwardly from the conduit interior surface into the moving fluid stream, said free ends extending generally parallel to and in the direction of fluid flow in said conduit so that the moving fluid stream impinges upon each of said free ends of said flexible fibers.

10. A device as claimed in claim 9 wherein said fibers have an average diameter of 1 to 50 microns.

11. A device as claimed in claim 9 wherein said conduit has a circular cross-section, and wherein said geometrical surface is circular in cross-section and generally concentric with said conduit.

12. A device as claimed in claim 10 wherein said fibers comprise a fiber mat having a multiplicity of unidirectional fibrous projections on the surface thereof.

13. A device as claimed in claims 9, 10, 11 or 12 further comprising means for retaining said plurality of fibers in place in operative attachment to said conduit interior surface, said means comprising a spiral coil of wire.

14. A device as claimed in claims 9, 10, 11 or 12 further comprising means for retaining said plurality of fibers in place in operative attachment to said conduit interior surface, said means comprising a wire mesh.

15. A method of absorbing acoustic energy from a moving fluid stream, said method comprising:
   providing a conduit having an interior surface, and providing
   a plurality of flexible, unidirectional closely spaced fibers operatively attached at one end thereof to said conduit interior surface, flowing a moving fluid stream through said conduit and over said fibers, the free ends of said fibers extending generally inwardly from said conduit interior and into the moving fluid stream, said free ends extending generally parallel to and in the direction of fluid flow in said conduit and dircting and impinging the moving fluid stream upon said free ends of said flexible fibers, the free ends of said fibers define a generally regular geometrical surface providing an unobstructed fluid flow passage.

16. A method of absorbing acoustic energy from the exhaust system of an internal combustion engine comprising providing means operatively attached to the exhaust pipe of said engine for effectively absorbing the acoustic energy of fluid flowing through said exhaust pipe and
   flowing fluid through said exhaust pipe while allowing passage of the fluid therethrough such that only negligible back pressure is created,
   said means comprising a conduit disposed in line with said exhaust pipe, having an interior surface with a plurality of flexible, unidirectional, closely spaced fibers operatively attached at one end thereof to said conduit surface and having the free ends of said extending generally inwardly into said conduit and into the moving fluid stream, said free ends extending generally parallel to, flexing and in the direction of fluid flow in said conduit and impinging the moving fluid stream upon said free ends and flexing said fibers, the free ends of said fibers defining an unobstructed fluid flow passage of generally the same cross-sectional area as the cross-sectional area of said exhaust pipe.

* * * * *

UNITED STATES PATENT OFFICE
CERTIFICATE OF CORRECTION

Patent No. 4,211,305　　　　　　　　　Dated July 8, 1980

Inventor(s) Carl Matthews & Elizabeth de Recourt Martyn

It is certified that error appears in the above-identified patent and that said Letters Patent are hereby corrected as shown below:

On the title page of the patent, left hand column, after "Filed: Nov. 9, 1978" insert Foreign Application Priority Data Feb. 3, 1976　　Great Britain ---------------------4258/76

April 28, 1977　Great Britain ---------------------17795

*Signed and Sealed this*

*First* Day of *March 1983*

|SEAL|

*Attest:*

GERALD J. MOSSINGHOFF

*Attesting Officer*　　*Commissioner of Patents and Trademarks*